United States Patent [19]

Mori

[11] Patent Number: 4,902,089

[45] Date of Patent: Feb. 20, 1990

[54] SOLAR RAY-COLLECTING DEVICE

[76] Inventor: Kei Mori, 3-16-3-501, Kaminoge, Setagaya-ku, Tokyo, Japan

[21] Appl. No.: 255,913

[22] Filed: Oct. 11, 1988

[30] Foreign Application Priority Data

Feb. 4, 1988 [JP] Japan .................................. 63-25358

[51] Int. Cl.⁴ .............................................. G02B 5/172
[52] U.S. Cl. ................................. 350/96.18; 350/96.10
[58] Field of Search ................. 350/96.10, 96.15, 96.18, 350/96.19, 96.20

[56] References Cited

U.S. PATENT DOCUMENTS

| | | | |
|---|---|---|---|
| 4,389,085 | 6/1983 | Mori | 350/96.18 |
| 4,484,565 | 11/1984 | Mori | 126/425 |
| 4,553,238 | 11/1985 | Shaw et al. | 350/96.15 X |
| 4,654,532 | 3/1987 | Hirschfeld | 250/458.1 |
| 4,729,621 | 3/1988 | Edelman | 350/96.18 X |

Primary Examiner—William L. Sikes
Assistant Examiner—Akm E. Ullah
Attorney, Agent, or Firm—Jordan and Hamburg

[57] ABSTRACT

A solar ray-collecting device comprising a Fresnel lens, an optical coupling made of a tip-cut conical light guide and an optic cable is described. The solar rays focused by the lens are received at the large end of the optical coupling and discharged from the small end of the optical coupling and further guided into the optic cable. The Fresnel lens has a numerical aperture smaller than that of the optic cable. The optical coupling has the light-emitting end with the numerical aperture equal to that of the optic cable so as to eliminate the reflection loss. The light-emitting end of the optical coupling being adhesively joined to the light-receiving end of the optic cable by the use of an optical paste.

1 Claim, 3 Drawing Sheets 4,902,089

SOLAR RAY-COLLECTING DEVICE

BACKGROUND OF THE INVENTION

The present invention relates to a solar ray collecting device in which the sunlight, focused by the use of a Fresnel lens, is effectively guided into an optic cable.

The present applicant has previously proposed a solar ray collecting device comprising a large number of lenses. The solar rays focused by the lenses are guided into the optical conductor cables. The solar rays guided in such a way are transmitted through the optical conductor cable onto an optical desired place.

In the above mentioned solar ray collecting device, when the numerical aperture angle of the lens is large, the sun's image, focused by the lens, is small. Consequently, a optic cable of small diameter can be used. This is the advantage of its size. However, the rising angle at the circumferential portion of lens is large, and therefore the amount of light reflecting at this portion is large and the focusing efficiency is not good. The incident angle of the optic cable is also large. Consequently, the amount of reflection is large at the light-receiving end of the optic cable and the solar ray guiding efficiency into the optic cable is not good. Furthermore, the solar rays entering the lens are reflected onto the light-emitting end of it and returned into the lens. Thereafter, the reflected solar rays propagate inside the lens. For this reason the incident rays cannot be guided effectively into the optic cable.

On the other hand, when the numerical aperture of the lens is small, the rising angle at the circumferential portion of it is small. Consequently, the amount of reflection is small at this side and the incident angle for the optic cable is small so that the amount of reflection at the light-receiving end of the optic cable is also small. Therefore the collection of solar rays becomes more efficient. On the contrary, the sun's image focused by the lens is large. Consequently, the diameter of the optic cable needs to be large. Consequently the cost of the optic cable becomes high. Those matters are the weak points of the prior art.

SUMMARY OF THE INVENTION

It is an object of the present invention to enable the use of a optic cable of a large numerical aperture and further to eliminate reflection on the light-receiving end of the optic cable in order to maintain high efficiency in guiding the solar rays into the optic cable.

It is another object of the present invention to decrease the diameter of the optic cable with the intention of lowering its cost.

DESCRIPTION OF THE PREFERRED EMBODIMENTS

Figure 1:
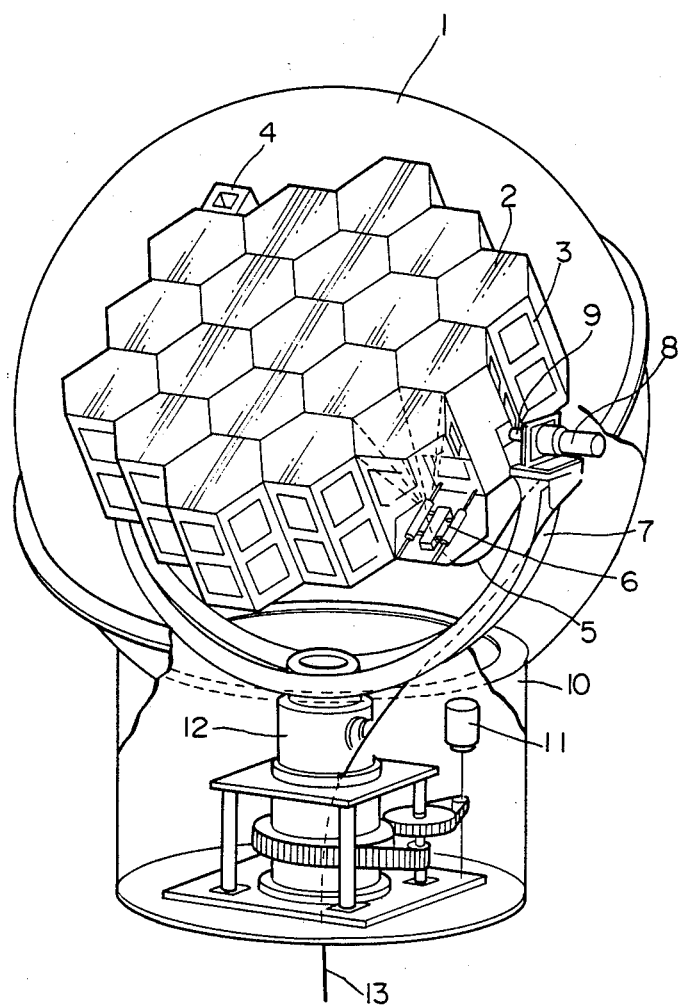
FIG. 1 is a perspective view for explaining an embodiment of a solar ray collecting device previously proposed by the present applicant.

FIG. 1 is a detailed perspective view for explaining an embodiment of a solar ray collecting device. In FIG. 1, the reference numeral 1 designates a transparent protective capsule, 2 a Fresnel lens, 3 a lens-holding tool, 4 a direction sensor for sensing the direction of the solar rays, 5 an optical fiber (or an optical conductor cable) having a light-receiving end to be disposed at the focal position of the Fresnel lens 2, 6 a fiber holder, 7 an arm, 8 a pulse motor, 9 a horizontal rotatable shaft rotated by the pulse motor 8, 10 a foundation for carrying the protective capsule 1, 11 a pulse motor, and 12 a vertical rotatable shaft turned by the pulse motor 11.

As was already proposed by the present applicant, the above-mentioned solar ray collecting device detects the direction of the sun by use of the sun's ray direction sensor 4, and its detection signal drives the pulse motors 9 and 11. Both the pulse motors 8 and 11 rotate the horizontal rotatable shaft 9 and the vertical rotatable shaft 12, respectively, so as to guide the sun ray direction sensor 4 in the direction of the sun. In such a way, the sun's rays focused by each of the lenses 2 are respectively guided into the optical fibers 5 having a light-receiving end disposed at the focal position of the respective lenses. An optical fiber or an optical conductor cable 5 is provided for each lens and taken out from the solar ray collecting device, bundled with together into a cable 13 and led to an optional desired place where it is used.

Figure 2:
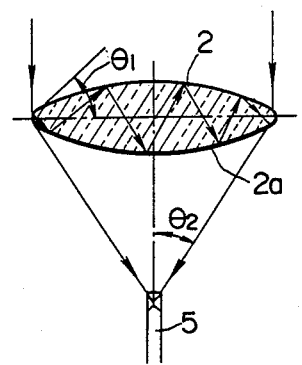
FIGS. 2 through 4 are, respectively, construction views for explaining embodiments of the prior art of the solar ray collecting device.
Figure 3:
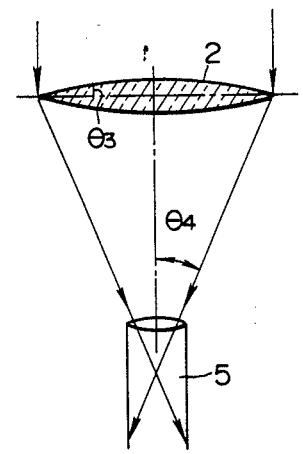

FIGS. 2 and 3 are, respectively, construction views for explaining embodiments of the prior art of solar ray collecting devices. In FIGS. 2 and 3, the reference numeral 2 designates a lens for focusing the sunlight, and 5 a optic cable into which the focused solar rays are guided. FIG. 2 shows an embodiment in the case of a large numerical aperture (angle) of the lens 2, and FIG. 3 shows another embodiment in the case of small numerical aperture (angle) of the lens 2.

When the numerical aperture of the lens 2 is large, the sun's image, focused by the lens 2, is small as shown in FIG. 2. Consequently, a optic cable of small diameter can be used. This is the advantage of its size. On the contrary, the rising angle $\theta_1$ at the circumferential portion of the lens 2 is large, and therefore the amount of light reflecting at this portion is large and the focusing efficiency is not good. The incident angle $\theta_2$ of the optic cable 5 is also large. Consequently, the amount of reflection is large at the light-receiving end of the optic cable 5 and the solar ray guiding efficiency into the optic cable 5 is not good. Furthermore, the solar rays entering the lens 2 are reflected onto the light-emitting end 2a and returned into the lens 2. Thereafter, the reflected solar rays propagate inside the lens 2. For this reason the incident rays cannot be guided effectively into the optic cable.

On the other hand, when the aperture angle of the lens 2 is small, the rising angle $\theta_3$ at the circumferential portion of the lens 2 is also small. Consequently, the amount of reflection is small at this side and the incident angle $\theta_4$ for the optic cable 5 is small so that the amount of reflection at the light-receiving end of the optic cable 5 is also small. Therefore the collection of rays becomes more efficient. On the contrary, the sun's image focused by the lens 2 is large as shown in FIG. 3. Consequently, the diameter of the optic cable needs to be large. Consequently the cost of the optic cable becomes high. Those matters are the weak points of the prior art.

Figure 4:
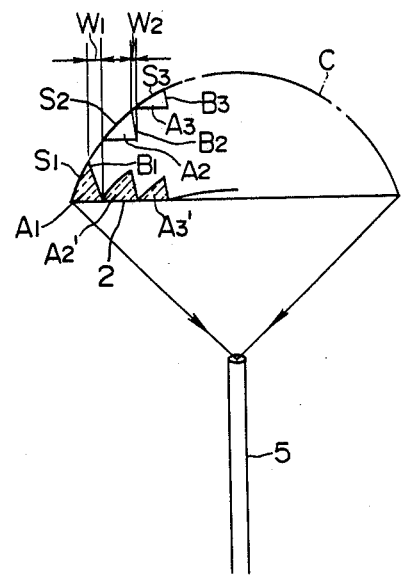

FIG. 4 is an enlarged diagram of the main part of a Fresnel lens employed in place of a lens with a large aperture angle as shown in FIG. 2. As is well known, a Fresnel lens is the one in which its thickness is decreased through the effective utilization of the curved surface C of an ordinary lens as shown in FIG. 2 and therefore its total weight is also decreased. In the case of employing such a Fresnel lens instead of the respective lenses shown in FIGS. 2 and 3, both the size of the device and the weight thereof can be decreased. Especially, in the case of having the lens follow the movement of the sun, the weight of the moving portion is decreased so that its action can be speed up. Such are the preferred conditions for the device.

On the other hand, in the case of employing a Fresnel lens as shown in FIG. 2, in principle, a lens of a large aperture angle is cut off as shown by $A_1$, $A_2$, $A_3$, .... The cut-off portions of the lens are arranged at a horizontal plane as shown by $A_1$, $A_2$, $A_3$, ..., and the lens surfaces, $S_1$, $S_2$, $S_3$, ..., are utilized as the surfaces of the Fresnel lens. On that occasion, when the lens is cut off as shown by $A_1$, $A_2$, $A_3$, ..., the surfaces $B_1$, $B_2$, $B_3$, ... have to be cut off obliquely as shown in FIG. 4. In such a construction, the light rays corresponding to $W_1$, $W_2$, ... cannot be utilized. For this reason, it proves to be ineffective.

The present invention was made in order to solve the defects of the prior art as mentioned above. In particular, it is an object of the present invention to enable the use of a optic cable of a large aperture number and further to eliminate reflection on the ligh-receiving end of the optic cable in order to maintain high efficiency in guiding the solar rays into the optic cable. Another object of the present invention is to make it possible to decrease the diameter of the optic cable with the intention of lowering its cost.

Figure 5:
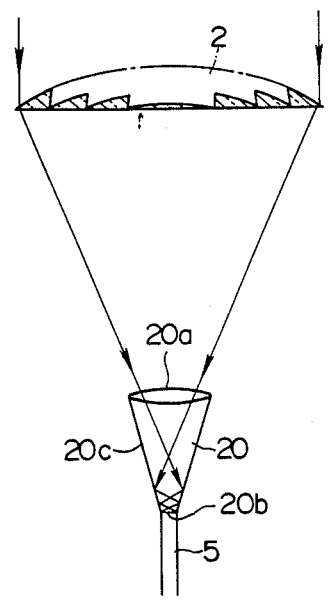
FIG. 5 is a construction view for explaining an embodiment of the solar ray collecting device according to the present invention.

FIG. 5 is a construction view for explaining an embodiment of the solar ray collecting device according to the present invention. In FIG. 5, the reference numeral 2 designates a Fresnel lens for focusing the sun's rays, 5 a optic cable, and 20 an optical coupling consisting of a tip-cut conical light guide, having a wide end 20a for light-receiving end and a small end 20b for light-emitting.

In the present invention, a Fresnel lens of a small numerical aperture, in other words, having not so large a rising angle at the circumferential portion thereof is employed as a light-focusing lens. However, a Fresnel lens 2 of a small numerical aperture has a small rising angle at the circumferential portion thereof, and consequently the amount of reflection thereof is small. And further, the oblique cut explained in FIG. 4 can be made small, and therefore the solar rays can be effectively focused by means of the Fresnel lens 2. However, since the sun's image focused by a Fresnel lens 2 with a small numerical aperture is large, in the case of directly guiding the solar rays focused by the Fresnel lens into the optic cable 5, a optic cable of a large diameter has to be employed, so that the cost of the device becomes high.

On the other hand, if the diameter of the optic cable 5 is to be decreased, the aperture angle of the lens 2 has to be increased in order to make small the image focused by the lens 1. However, when the aperture angle of the lens 2 is increased, the incident angle of the solar rays at the incident end surface of the optic cable 2 is also increased as mentioned before, so that the loss of reflection becomes great. This is a problem to be solved. Hence, in the present invention, the optical coupling 20 having a light-receiving end 20a of a large surface and the light-emitting end 20b of a small surface is employed, and the comparatively large sun's image focused by the Fresnel lens 2 of a comparatively small numerical aperture is received at the large end 20a of the optical coupling 20 and guided into the optical coupling 20.

The solar rays guided into the optical coupling 20 are reflected by the circumferential surface 20c and propagate toward the light-emitting end 20b. Whenever such reflections are repeated, the aperture angle becomes larger and larger. Finally, the aperture angle at the light-emitting end 20b becomes approximately equal to the numerical aperture of the optic cable 5. Consequently, if the solar rays emitted from the optical coupling 20 can be guided into the optic cable 5, the light rays can propagate inside the optic cable 5. In such a way, the light rays can be transmitted most effectively.

However, as mentioned before, in the case where the numerical aperture of the optical conductor cable 5 is large, the solar rays of a large corresponding incident angle (aperture angle) are guided into the optic cable 5 of a large opening number. However, the loss of reflection is large at its light-receiving end of the optic cable 5, so that the solar rays cannot be effectively guided into the optic cable 5. On the contrary, in the present invention, the light-emitting end 20b of the optical coupling 20 is unitarily and adhesively joint to the light-receiving end surface of the optic cable 5 by the use of an optical paste or the like. Consequently, the loss of reflection at the light-receiving end of the optic cable 5 can be eliminated completely.

As is apparent from the foregoing description, according to the present invention, when there is a Fresnel lens of a small numerical aperture, the loss of reflection at the circumferential portion of the lens can be made smaller compared with the case in which the Fresnel lens is of a large numerical aperture. In addition to that, the slantedly-cut surface required at the time of forming the Fresnel lens is reduced, so that the solar rays can be focused effectively. And further, by the use of an optical coupling having a large light-receiving surface, the Fresnel lens of a small numerical aperture can be employed and thereby the loss of reflection on the light-receiving surface of the optical coupling can be reduced. When the solar rays pass through the optical coupling, the aperture angle of the solar rays is increased. Moreover, the aperture angle can be increased such that it becomes a maximum provable aperture angle to be taken by the optic cable. Consequently a optic cable of a large numerical aperture can be employed and a optic cable of a small diameter can be employed. As a result, the cost of the optic cable can be reduced. Furthermore, the loss of reflection at the light-receiving end of the optic cable can be eliminated completely by unitarily and adhesively connecting the light-emitting end of the optical coupling to the light-receiving end of the optic cable by the use of an optical paste or the like.

I claim:

1. A solar ray-collecting device comprising a Fresnel lens for focusing the sunlight, an optical coupling means having a frusto-conical configuration with a large light-receiving end and a small light-emitting end, said large light-receiving end being spaced from said Fresnel lens and being disposed at the focal position of said Fresnel lens such that the sun's light rays focused by said Fresnel lens are guided into said large light-receiving end of said coupling means and are reflected by the circumferential surface of said coupling means as said light rays propagate toward said small light-emitting end of said coupling means, an optical cable having a light-receiving end, and optical adhesive means adhesively connecting said light-receiving end of said optical cable to said small light-emitting end of said coupling means such that the collected rays are transmitted from said coupling means to said optical cable without loss of reflection, said Fresnel lens having a plurality of lens sections disposed generally in a single plane, each of said lens sections having a lens surface part and an oblique part disposed at an oblique angle relative to said single plane such that said lens surface parts are effective to transmit usable light rays and said oblique parts are ineffective to transmit usable light rays, said Fresnel lens having a numerical aperture equal to that of said optical cable, said coupling means enabling use of a Fresnel lens of a minimized numerical aperture with minimized oblique angles of said oblique parts, an optical cable of a maximized numerical aperture, and an optical cable of a minimized diameter in which the loss of reflection at the light-receiving end of said optical cable is eliminated by said optical adhesive means which adhesively connects said light-receiving end of said optical cable to said small light-emitting end of said coupling means.

* * * * *